United States Patent
McCulloch et al.

(10) Patent No.: US 8,965,741 B2
(45) Date of Patent: Feb. 24, 2015

(54) CONTEXT AWARE SURFACE SCANNING AND RECONSTRUCTION

(75) Inventors: Daniel J. McCulloch, Kirkland, WA (US); Ryan L. Hastings, Seattle, WA (US); Jason Scott, Kirkland, WA (US); Holly A. Hirzel, Kirkland, WA (US); Brian J. Mount, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 347 days.

(21) Appl. No.: 13/454,258

(22) Filed: Apr. 24, 2012

(65) Prior Publication Data
US 2013/0282345 A1    Oct. 24, 2013

(51) Int. Cl.
G06G 7/48    (2006.01)
G06T 15/00   (2011.01)
G06F 3/0488  (2013.01)

(52) U.S. Cl.
CPC .............. *G06T 15/00* (2013.01); *G06F 3/0488* (2013.01)
USPC ............................................. 703/6; 345/419

(58) Field of Classification Search
CPC ......... G06T 15/00; G06T 19/00; G06T 11/60; G06T 13/40; G06F 17/30; G06F 17/50; G06F 3/0488; G06F 3/0482; G06F 3/01; G06F 9/44; G06F 3/048; G01V 3/08; E04H 6/00; E04H 14/00; E04H 1/02; G06Q 10/00; G06Q 10/06; G06Q 50/08; G06Q 40/08; G06Q 40/00; G06Q 50/06; B60R 21/015; G06K 9/00; G06K 7/10; G01J 1/34; E04B 1/38; E04B 1/00; A47H 13/00; G09G 3/02; G09G 5/377; H04L 9/28; H04L 12/24; A61B 5/11; A61B 5/113; G01B 21/10; G01B 21/18; G21K 7/00; G06N 5/02; G06N 99/00; G09B 19/00; G08B 5/00
USPC .......... 703/6, 7; 345/419; 324/326; 705/7, 50; 280/735; 52/79.9, 222; 702/150
See application file for complete search history.

(56) References Cited

U.S. PATENT DOCUMENTS 4,920,714 A * 5/1990 Sease .............................. 52/222
6,094,625 A * 7/2000 Ralston ......................... 702/150

(Continued)

OTHER PUBLICATIONS

Izadi, et al., "KinectFusion: Real-time 3D Reconstruction and Interaction Using a Moving Depth Camera", In Proceedings of the 24th Annual ACM Symposium on User Interface Software and Technology, Oct. 16, 2011, pp. 559-568.

*Primary Examiner* — Kandasamy Thangavelu
(74) *Attorney, Agent, or Firm* — Micah Goldsmith; Judy Yee; Micky Minhas

(57) ABSTRACT

A system for generating and updating a 3D model of a structure as the structure is being constructed or modified is described. The structure may comprise a building or non-building structure such as a bridge, parking garage, or roller coaster. The 3D model may include virtual objects depicting physical components or other construction elements of the structure. Each construction element may be associated with physical location information that may be analyzed over time in order to detect movement of the construction element and to predict when movement of the construction element may cause a code or regulation to be violated. In some cases, a see-through HMD may be utilized by a construction worker while constructing or modifying a structure in order to verify that the placement of a construction element complies with various building codes or regulations in real-time.

17 Claims, 15 Drawing Sheets

(56) References Cited

U.S. PATENT DOCUMENTS

| | | |
|---|---|---|
| 6,765,569 B2 | 7/2004 | Neumann et al. |
| 7,991,576 B2 | 8/2011 | Roumeliotis |
| 8,091,300 B2 | 1/2012 | Pyo |
| 2004/0109012 A1 | 6/2004 | Kraus et al. |
| 2005/0102063 A1 | 5/2005 | Bierre |
| 2007/0262574 A1* | 11/2007 | Breed et al. .................. 280/735 |
| 2009/0021514 A1* | 1/2009 | Klusza ......................... 345/419 |
| 2010/0066559 A1 | 3/2010 | Judelson |
| 2010/0235206 A1* | 9/2010 | Miller et al. ...................... 705/7 |
| 2010/0318465 A1* | 12/2010 | Nielsen et al. .................. 705/50 |
| 2011/0006772 A1* | 1/2011 | Olsson et al. ................. 324/326 |
| 2011/0016802 A1* | 1/2011 | Wallance ....................... 52/79.9 |
| 2012/0139915 A1* | 6/2012 | Muikaichi et al. ............ 345/419 |

* cited by examiner

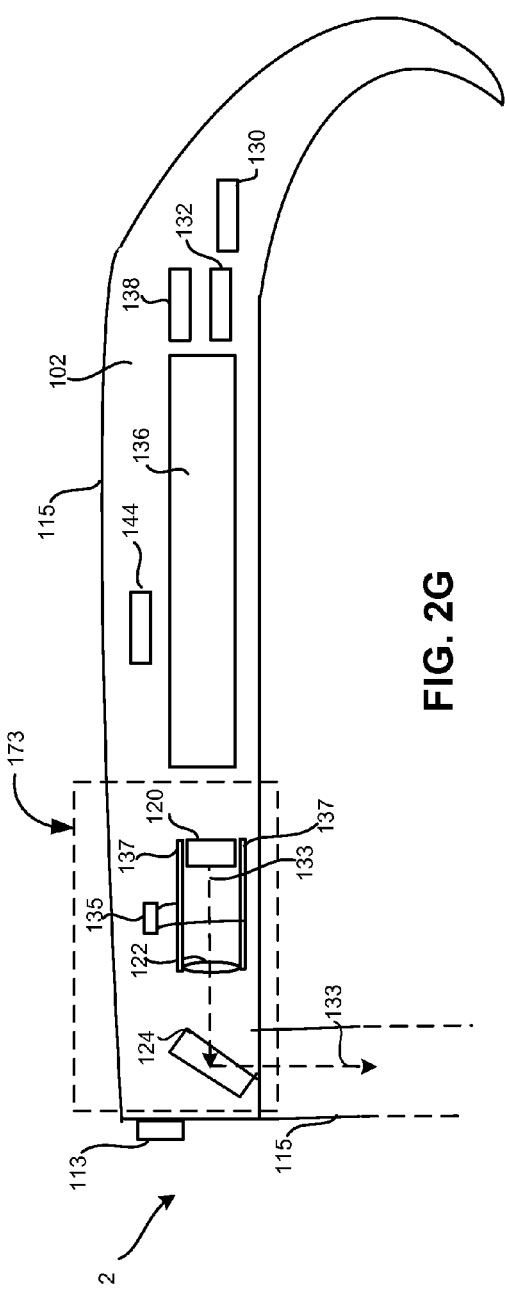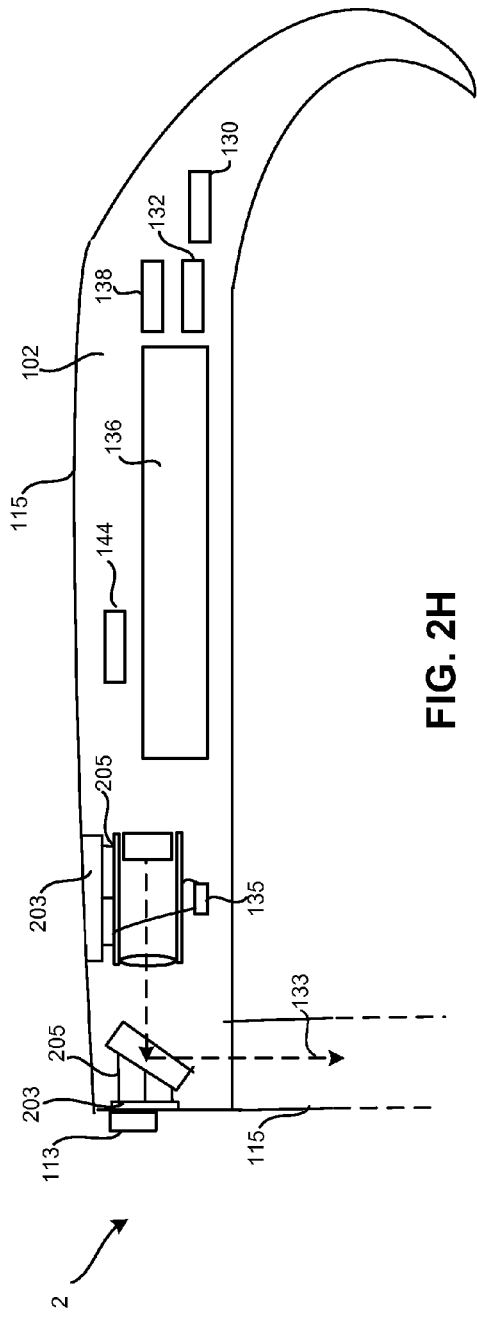

CONTEXT AWARE SURFACE SCANNING AND RECONSTRUCTION

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several steps including mapping and localization. Mapping relates to the process of generating a map of a real-world environment. Localization relates to the process of locating a particular point of view or pose relative to the map of the real-world environment. A fundamental requirement of many AR systems is the ability to localize the pose of a mobile device moving within a real-world environment in real-time in order to determine the particular view associated with the mobile device that needs to be augmented as the mobile devices moves within the real-world environment.

SUMMARY

Technology is described for generating and updating a 3D model of a physical structure as the structure is being constructed or modified. The structure may comprise a building or non-building structure such as a bridge, parking garage, or roller coaster. The 3D model may include virtual objects depicting physical components or other construction elements of the structure. Each construction element may be associated with physical location information that may be analyzed over time in order to detect movement of the construction element and to predict when movement of the construction element may cause a code or regulation to be violated. In some cases, a see-through head-mounted display device (HMD) may be utilized by a construction worker while constructing or modifying a structure in order to verify that the placement of a construction element complies with various building codes or regulations in real-time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2G depicts one embodiment of a side view of a portion of an HMD.

FIG. 2H depicts one embodiment of a side view of a portion of an HMD which provides support for a three dimensional adjustment of a microdisplay assembly.

DETAILED DESCRIPTION

Figure 1:
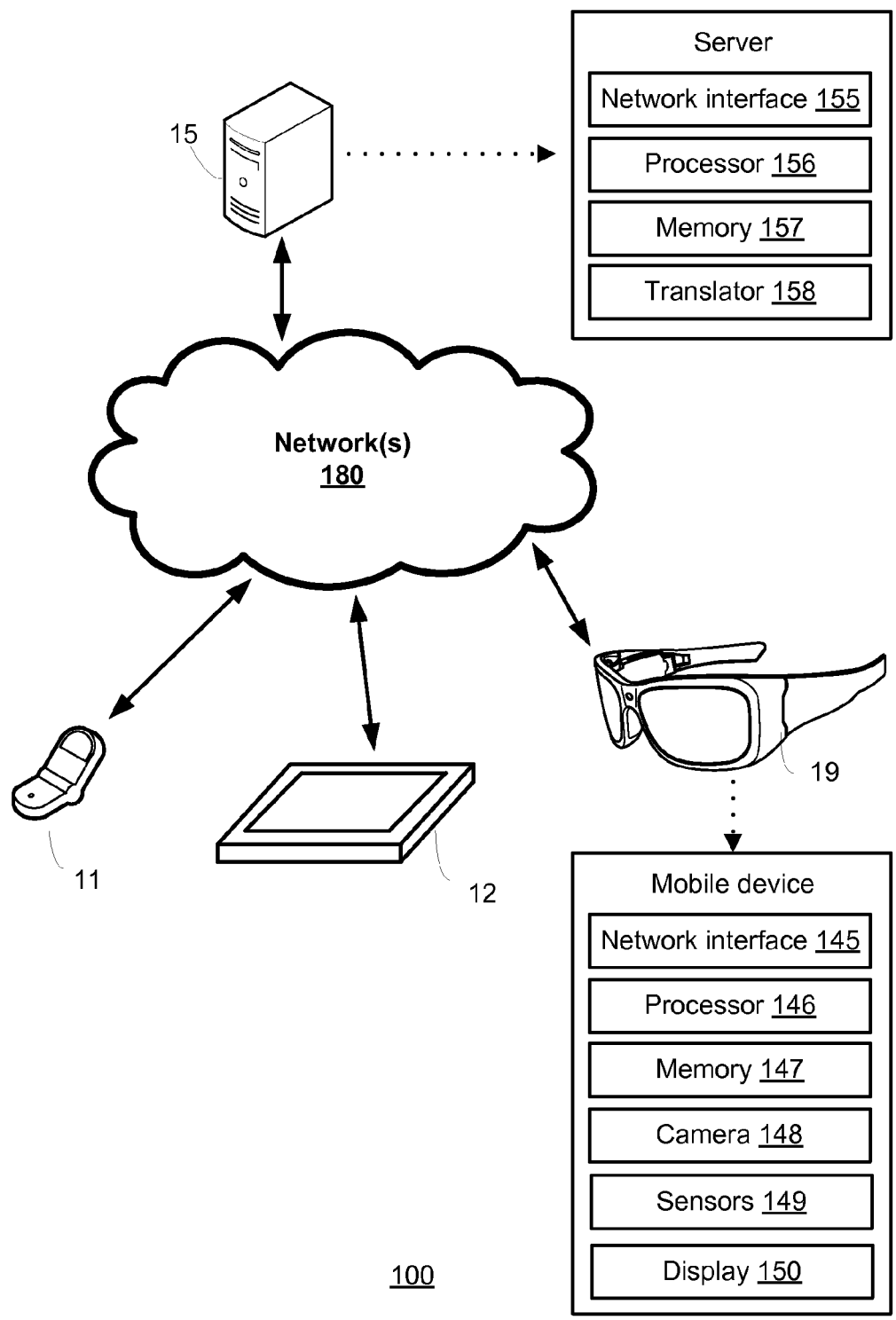
FIG. 1 is a block diagram of one embodiment of a networked computing environment in which the disclosed technology may be practiced.

Technology is described for generating and/or updating a 3D model of a structure as the structure is being constructed or modified. The structure may comprise a building structure (e.g., a house or apartment) or non-building structure (e.g., a bridge, parking garage, or roller coaster). The structure may also comprise a movable structure as an automobile or airplane. The 3D model may include virtual objects depicting physical components or other construction elements of the structure. Each construction element may be associated with physical location information that may be analyzed over time in order to detect movement of the construction element and to predict when movement of the construction element may cause a code (e.g., a building code) or regulation to be violated. In some cases, a see-through HMD may be utilized by a construction worker while constructing or modifying a structure in order to verify that the placement of a construction element complies with various building codes or regulations in real-time.

One issue involving the modification of a structure after it has been constructed (e.g., a house) is that determining the location of various construction elements (e.g., water pipes, electrical wiring, and wall studs) of the structure may be difficult because the construction elements may be not directly observable (e.g., hidden behind drywalls) and their actual location may either vary or not be ascertainable from blueprints or other technical drawings of the structure. Moreover, without accurate location information for a structure's construction elements, determining whether the structure complies with updated building codes or regulations may not be possible. Thus, there is a need for an augmented reality system capable of generating a 3D model of a structure as the structure is being constructed (or modified) that records the physical location of the structure's construction elements before the construction elements are concealed by walls, dirt, or other non-transparent layers.

With the advent and proliferation of continuously-enabled and network-connected mobile computing devices, such as head-mounted display devices (HMDs), the amount of information available to an end user of such computing devices at any given time is immense. In some cases, an augmented reality environment may be perceived by an end user of a mobile computing device. In one example, the augmented reality environment may comprise a personalized augmented reality environment wherein one or more virtual objects are generated and displayed to an end user based on an identification of the end user, user preferences associated with the end user, the physical location of the end user, and/or environmental features associated with the physical location of the end user. In one embodiment, the one or more virtual objects may correspond with construction elements of a structure. Each of the one or more virtual objects may be associated with physical location information (e.g., a set of points describing the position and/or orientation of a construction element), component identification information (e.g., an identification of the construction element itself or the manufacturer of the construction element), historical placement information (e.g., a record of when the location of the construction element was fixed or otherwise became part of a structure and the person responsible for placement of the construction element), and connectivity information (e.g., how a particular construction element is connected to other construction elements).

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file is a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. Sensors 149 may comprise an inertial measurement unit (IMU). Display 150 may display digital images and/or videos. Display 150 may comprise a see-through display.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment for an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing the HMD, the end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment is performed by server 15 (i.e., on the server side) while camera localization is performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may be used by a person considering home construction or renovation or by a person performing a home inspection in order to acquire and access a 3D construction model or record that includes home construction information such as where hidden construction elements (e.g., hidden pipes, electrical wiring, or wall studs) are located. The 3D construction model may comprise a combination of blueprints, construction plans, and construction codes (e.g., building codes for determining structural, electrical, and heating requirements for a particular structure). Construction elements may include wall studs (steel or wood), water pipes, electrical wiring, electrical sockets, light switches, light sockets, windows, window frames, doors, door frames, appliances, HVAC components including furnaces and air conditioners, and water heaters. The construction elements may be associated with component properties such as construction element materials, identification information (e.g., a specific valve type or size), and/or the manufacturer of the construction element.

In one embodiment, an end user of an HMD may acquire a 3D construction model associated with a structure and use the 3D construction model in order to locate vision-obscured construction elements (e.g., construction elements hidden behind or within walls of the structure). For example, the end user may provide a command to the HMD to find or highlight a water pipe that is placed behind the walls of the structure.

In one embodiment, a construction worker may use an HMD while building a portion of a structure in order to verify that particular construction elements satisfy or comply with various building codes and regulations. The HMD may also suggest possible locations for a particular construction elements in real-time in order to help guide the construction worker. For example, a building code may require that fire sprinklers be located within a minimum distance (e.g., 20 feet) from each other. The HMD worn by the construction worker may display one or more virtual objects for guiding the construction worker to place or otherwise fix the construction elements within the portion of the structure. In some cases, building codes and/or building construction rules may be applied whenever the construction worker is looking at or gazing towards a particular construction element. The HMD may identify a construction element being looked at by a construction worker by utilizing gaze detection techniques.

In another embodiment, a home owner or public utility worker may use an HMD in order to determine the locations of sewer lines, gas lines, water pipes, and electrical wiring associated with a particular home. In some cases, if accurate location information is not available, construction codes may be used to provide a first-pass estimate to where particular construction elements may be located. The HMD may also predict based on historical location information of one or more construction elements if various building codes or regulations may be violated in the future by the one or more construction elements. The building codes or regulations may comprise construction rules regarding building safety and may be based on model building codes or local building codes. If the HMD determines that a particular building code may not be satisfied, then the HMD may provide feedback (audio or image-based feedback) to the end user of the HMD. The audio-based feedback may comprise a sound or audio warning. The image-based feedback may comprise a highlighting or coloring of a particular construction element as viewed by the end user of the HMD.

In some embodiments, historical location information associated with a particular construction element may be used to facilitate failure analysis or debug in the event of a structural failure of the structure. For example, information regarding when a particular construction element became part of the structure or an identification of the individual responsible for placement of the particular construction element may be helpful in discovering a cause for the structural failure. In some cases, each individual working on the structure may be associated with a video recording of their construction activities which may be subsequently referenced by date, time, and identity of the individual.

In one embodiment, a construction worker wearing an HMD may work normally on building a structure without actively worrying about positioning the HMD in order to update physical locations for various construction elements being added or fixed to the structure. The HMD will automatically identify construction elements within a field of view of the HMD and update a 3D construction model with physical location information and location confidence values for each construction element identified accordingly. In some cases, the identification of a particular construction element may be used to update an electronic blueprint or schematic of the structure. Moreover, as the 3D construction model of the structure may include representations for construction elements that are not explicitly specified in corresponding electronic blueprints of the structure, discrepancies between the 3D construction model of the structure and the electronic blueprints of the structure may be reported and/or may cause an automatic updating of the corresponding electronic blueprints.

In some embodiments, a 3D construction model may be associated with a time stamp. The time stamp may be based on a particular time or based on a time period during which a structure associated with the 3D construction model was renovated or modified. Each 3D construction model associated with a different time stamp may be placed into a record of 3D construction models. The record of 3D construction models may be used by construction professionals, home owners, potential home buyers, and utility workers in order view changes in a structure over time.

Figure 2A:
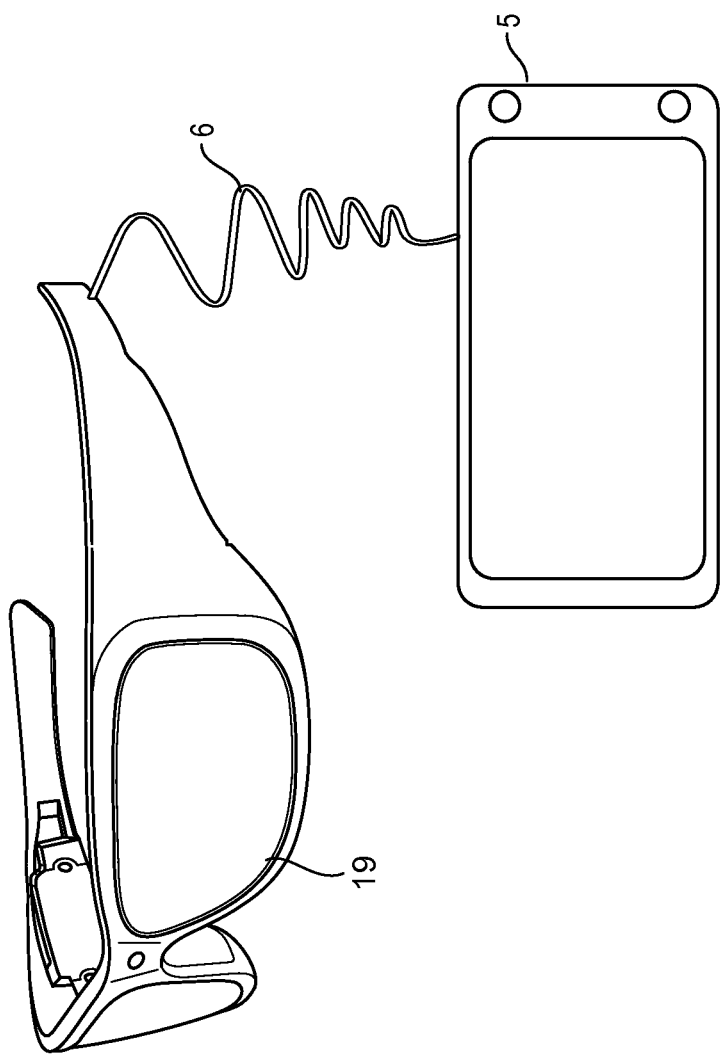
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection.

Mobile device 5 may be used by mobile device 19 in order to offload compute intensive processing tasks (e.g., the rendering of virtual objects) and to store virtual object information and other data necessary to provide an augmented reality environment on mobile device 19.

Figure 2B:
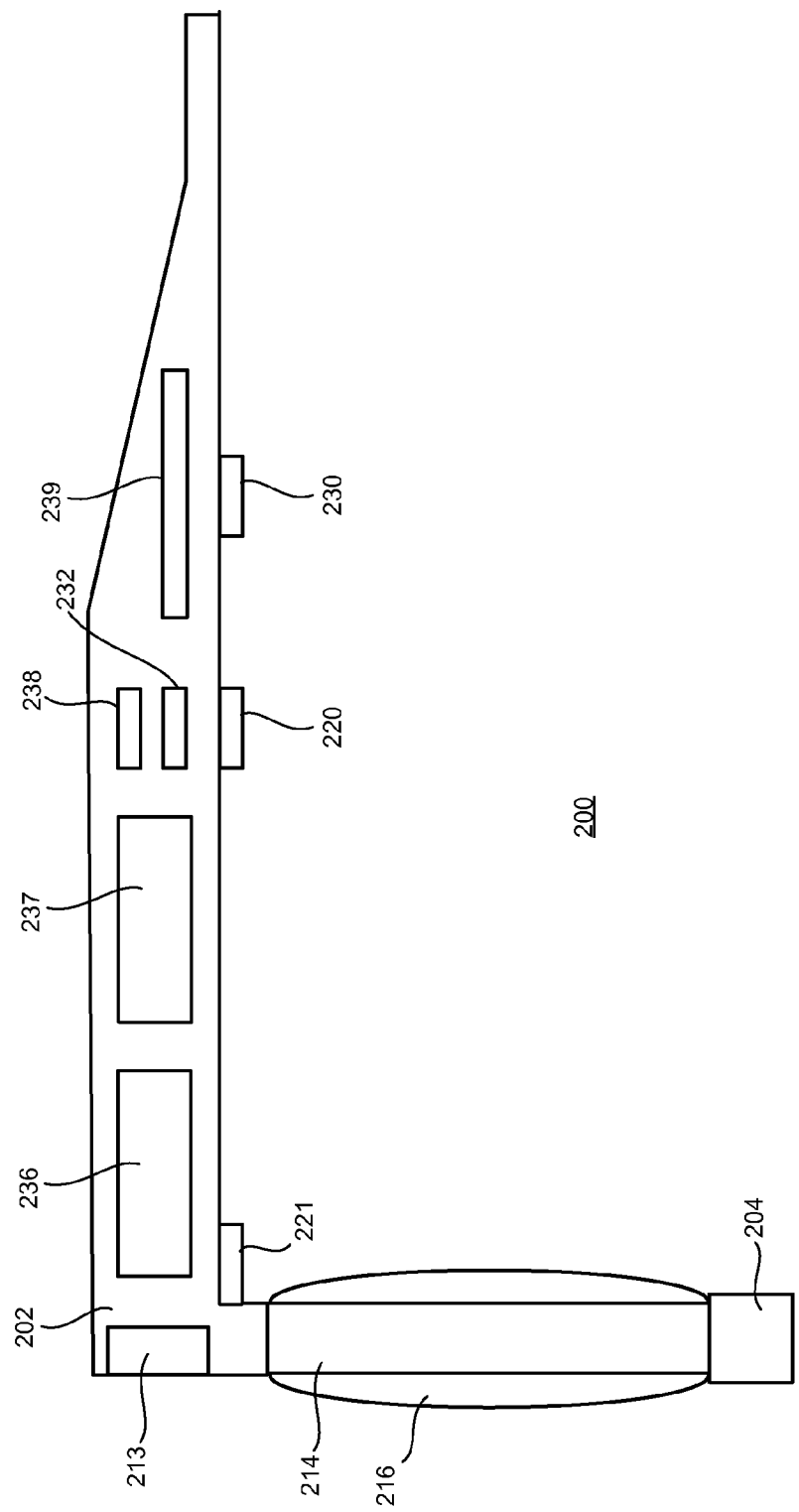
FIG. 2B depicts one embodiment of a portion of an HMD.

FIG. 2B depicts one embodiment of a portion of an HMD, such as mobile device 19 in FIG. 1. Only the right side of a head-mounted display device (HMD) 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
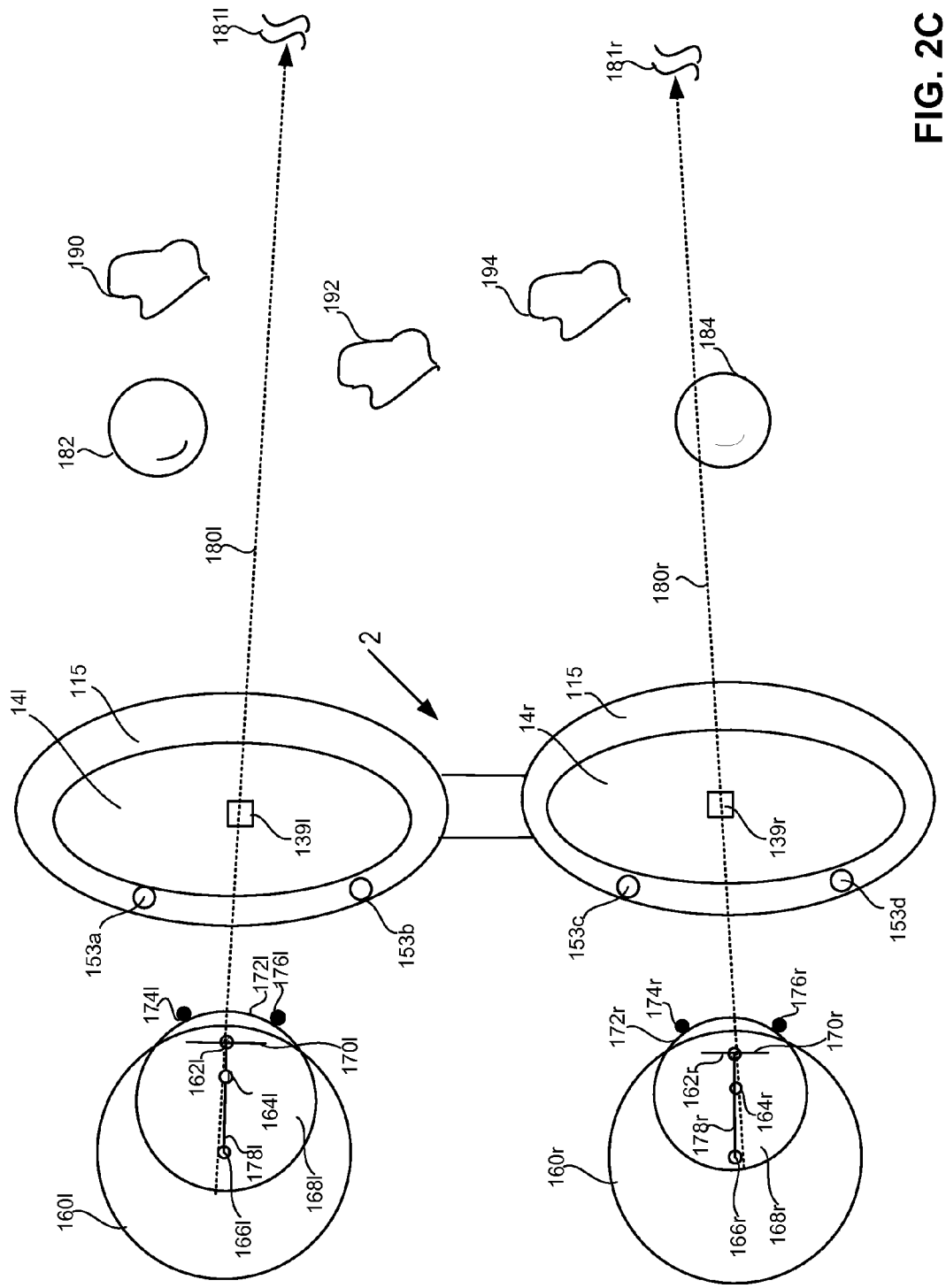
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
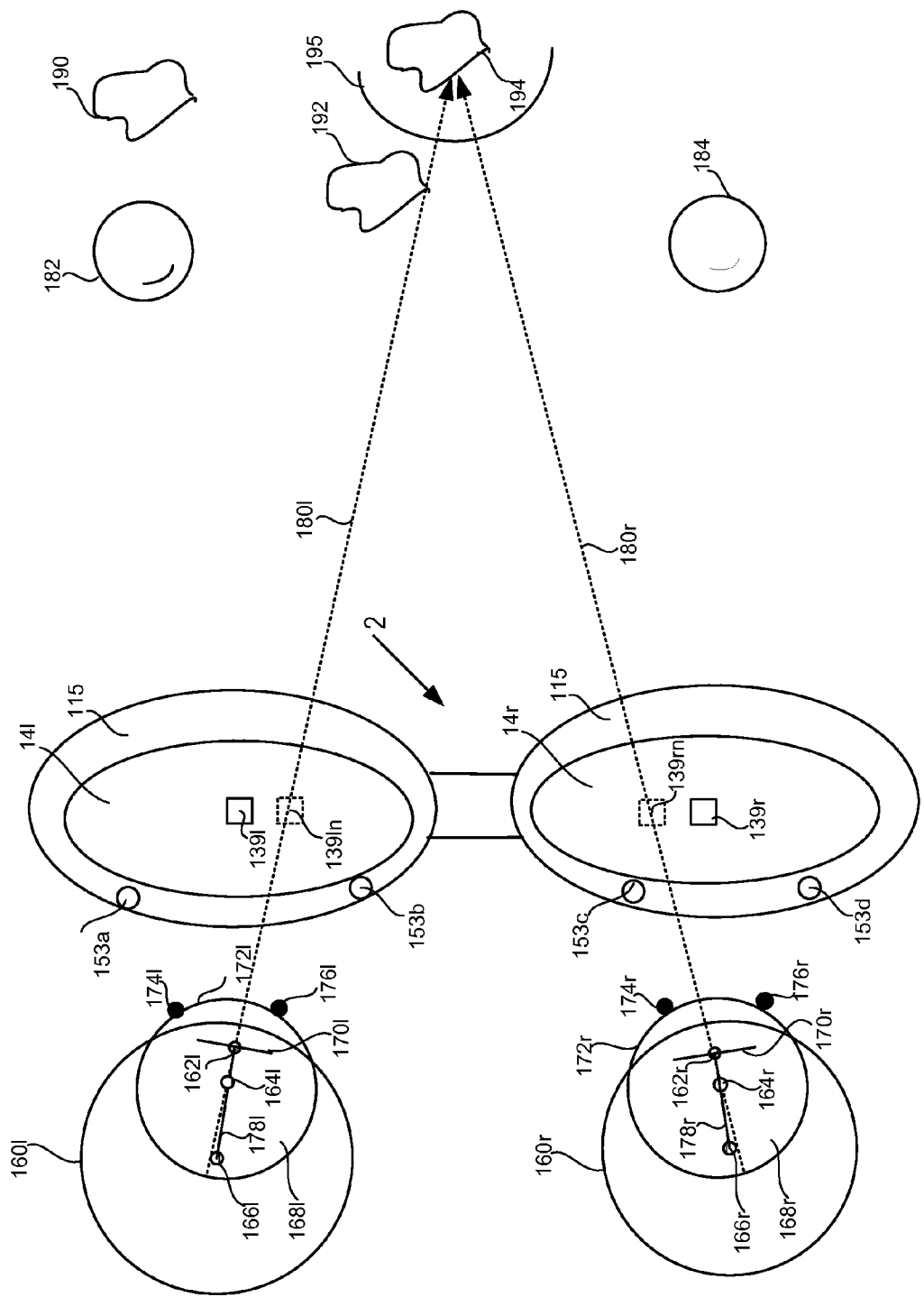
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. Patent Publication No. 2013/0083003, entitled "Personal Audio/Visual System," published Apr. 4, 2013, which is herein incorporated by reference in its entirety.

Figure 2E:
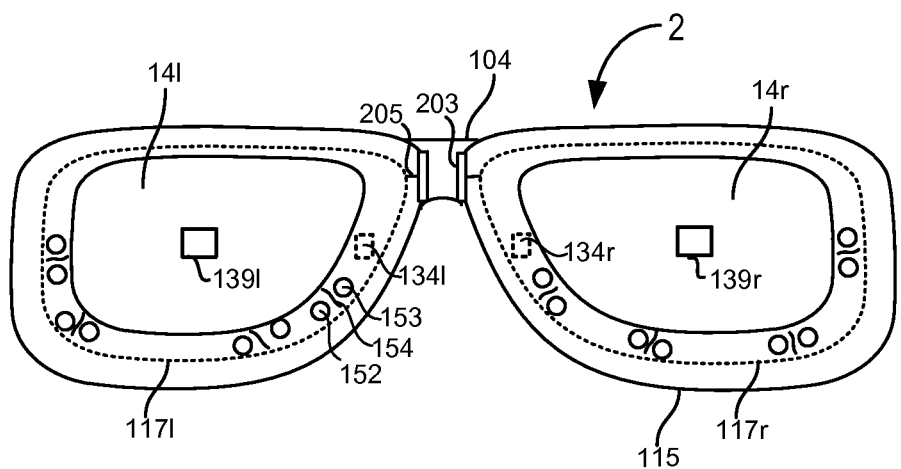
FIG. 2E depicts one embodiment of a portion of an HMD with movable display optical systems including gaze detection elements.

FIG. 2E depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 2E, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115.

In one embodiment, the at least one sensor 134 may be a visible light camera (e.g., an RGB camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 2E, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 2E, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 2F:
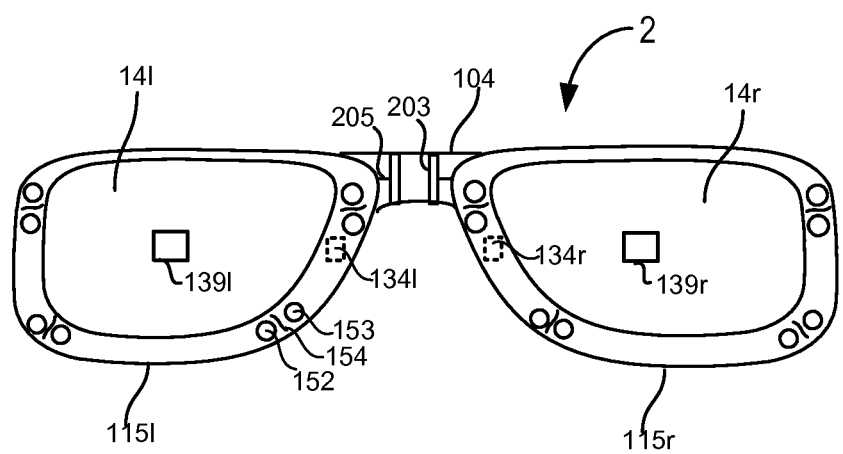
FIG. 2F depicts an alternative embodiment of a portion of an HMD with movable display optical systems including gaze detection elements.

FIG. 2F depicts an alternative embodiment of a portion of an HMD 2 with movable display optical systems including gaze detection elements. As depicted, each display optical system 14 is enclosed in a separate frame portion 115l, 115r. Each of the frame portions may be moved separately by the motors 203.

FIG. 2G depicts one embodiment of a side view of a portion of an HMD 2 including an eyeglass temple 102 of the frame 115. At the front of frame 115 is a front facing video camera 113 that can capture video and still images. In some embodiments, front facing camera 113 may include a depth camera as well as a visible light or RGB camera. In one example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light cameras (e.g., an RGB camera or image sensor) and depth cameras can be used. The data from the cameras may be sent to control circuitry 136 for processing in order to identify objects through image segmentation and/or edge detection techniques.

Inside temple 102, or mounted to temple 102, are ear phones 130, inertial sensors 132, GPS transceiver 144, and temperature sensor 138. In one embodiment, inertial sensors 132 include a three axis magnetometer, three axis gyro, and three axis accelerometer. The inertial sensors are for sensing position, orientation, and sudden accelerations of HMD 2. From these movements, head position may also be determined.

In some cases, HMD 2 may include an image generation unit which can create one or more images including one or more virtual objects. In some embodiments, a microdisplay may be used as the image generation unit. As depicted, microdisplay assembly 173 comprises light processing elements and a variable focus adjuster 135. An example of a light processing element is a microdisplay unit 120. Other examples include one or more optical elements such as one or more lenses of a lens system 122 and one or more reflecting elements such as surfaces 124. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124. The optical alignment may be along an optical axis 133 or an optical path 133 including one or more optical axes. The microdisplay unit 120 projects the image of the virtual object through lens system 122, which may direct the image light onto reflecting element 124. The variable focus adjuster 135 changes the displacement between one or more light processing elements in the optical path of the microdisplay assembly or an optical power of an element in the microdisplay assembly. The optical power of a lens is defined as the reciprocal of its focal length (i.e., 1/focal length) so a change in one effects the other. The change in focal length results in a change in the region of the field of view which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

More information about adjusting a focal distance of a microdisplay assembly can be found in U.S. Patent Publication No. 2012/0113091 entitled "Automatic Variable Virtual Focus for Augmented Reality Displays," filed Nov. 8, 2010, which is herein incorporated by reference in its entirety.

In one embodiment, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

Several different image generation technologies may be used to implement microdisplay 120. In one example, microdisplay 120 can be implemented using a transmissive projection technology where the light source is modulated by optically active material and backlit with white light. These technologies are usually implemented using LCD type displays with powerful backlights and high optical energy densities. Microdisplay 120 can also be implemented using a reflective technology for which external light is reflected and modulated by an optically active material. The illumination may be forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 2H depicts one embodiment of a side view of a portion of an HMD 2 which provides support for a three dimensional adjustment of a microdisplay assembly. Some of the numerals illustrated in the FIG. 2G above have been removed to avoid clutter in the drawing. In some embodiments where the display optical system 14 is moved in any of three dimensions, the optical elements represented by reflecting surface 124 and the other elements of the microdisplay assembly 173 may also be moved for maintaining the optical path 133 of the light of a virtual image to the display optical system. An XYZ transport mechanism in this example made up of one or more motors represented by motor block 203 and shafts 205 under control of control circuitry 136 control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

Figure 3:
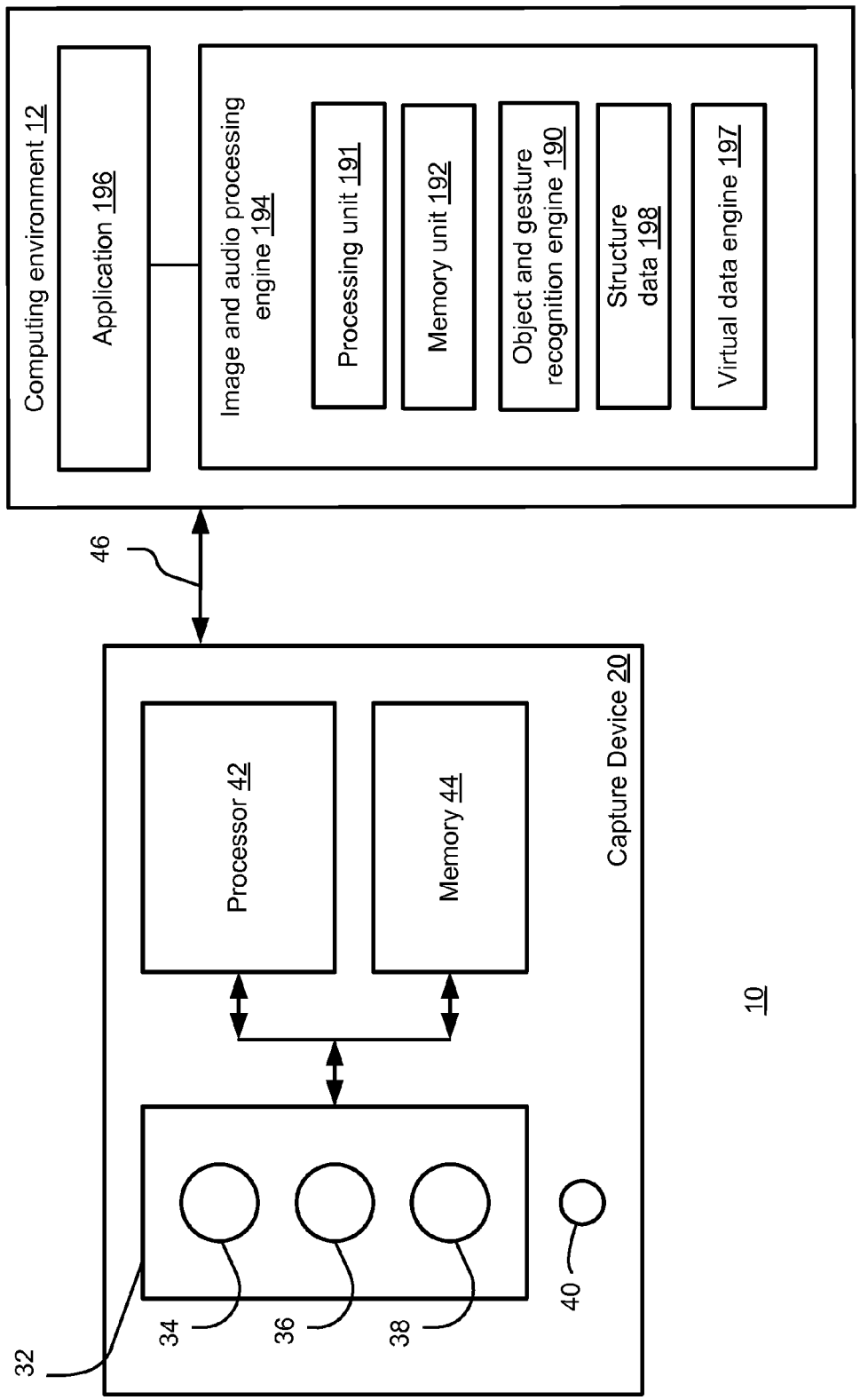
FIG. 3 illustrates one embodiment of a computing system including a capture device and computing environment.

FIG. 3 illustrates one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the image camera component 32.

The image camera component 32 may include an IR light component 34, a three-dimensional (3D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/475,308, "Device for Identifying and Tracking Multiple Humans over Time,", currently issued as U.S. Pat. No. 8,744,121 on May 14, 2014 which is incorporated herein by reference in their entirety. More information about object and gesture recognition engine 190 can be found in U.S. patent application Ser. No. 12/422,661, "Gesture Recognizer System Architecture," filed on Apr. 13, 2009, currently issued as U.S. Pat. No. 7,996,793 on Jul. 20, 2011, incorporated herein by reference in its entirety. More information about recognizing gestures can be found in U.S. patent application Ser. No. 12/391,150, "Standard Gestures," filed on Feb. 23, 2009, currently issued as U.S. Pat. No. 8,487,938 on Jun. 26, 2013; and U.S. patent application Ser. No. 12/474,655, "Gesture Tool," filed on May 29, 2009, currently issued as U.S. Pat. No. 8,856,691 on Sep. 17, 2014 both of which are incorporated by reference herein in their entirety.

Figure 4:
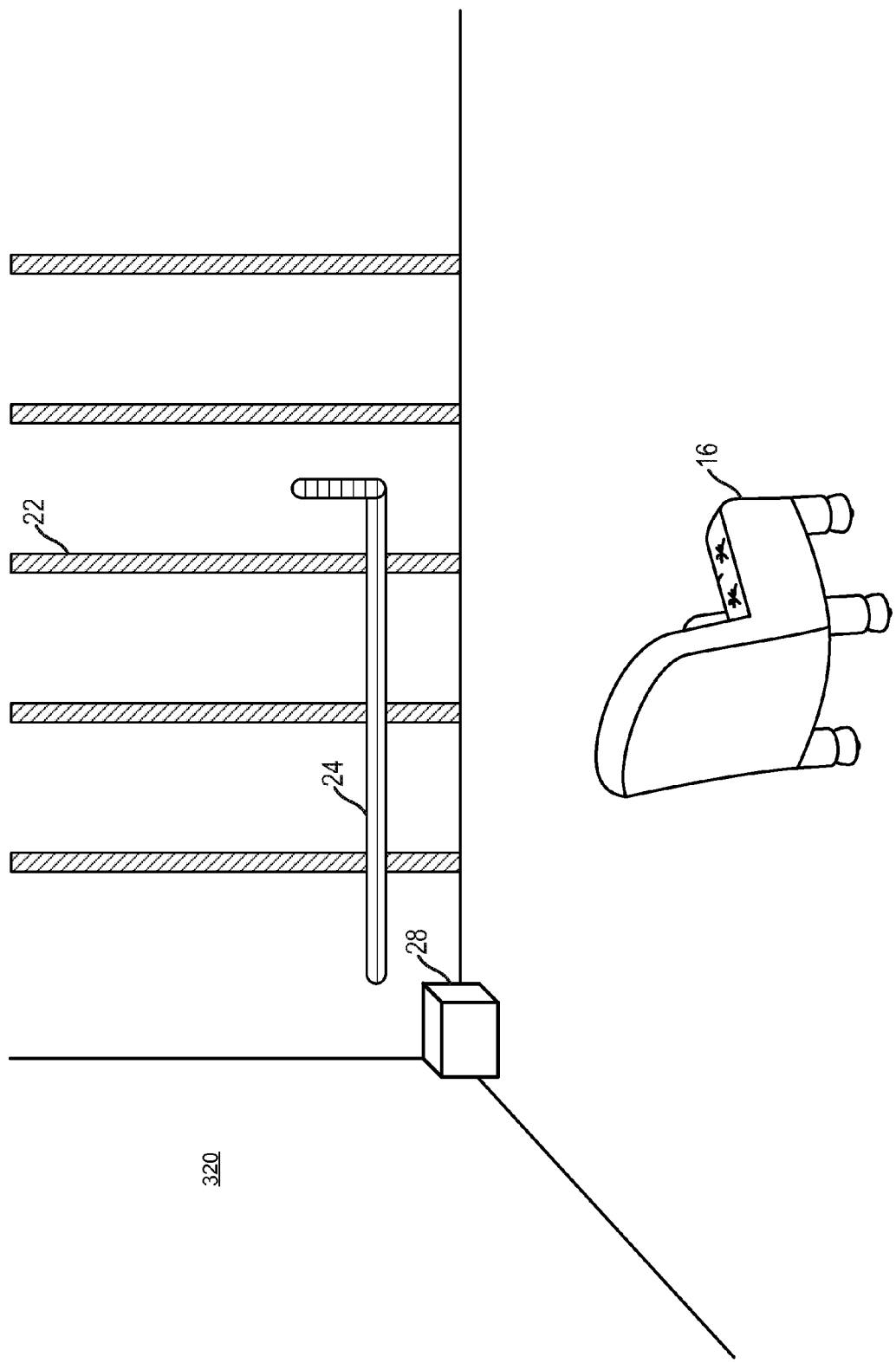
FIG. 4 depicts one embodiment of an augmented reality environment as seen by an end user wearing an HMD.

FIG. 4 depicts one embodiment of an augmented reality environment 320 as seen by an end user wearing an HMD, such as mobile device 19 in FIG. 1. The end user may view both real objects and virtual objects. The real objects may include a chair 16 and a fiduciary marker 28. The virtual objects may include virtual construction elements such as virtual stud 22 and virtual pipe 24. As the virtual construction elements are displayed or overlaid over the real-world environment as perceived through the see-through lenses of the HMD, the end user of the HMD may perceive that the virtual construction elements exist within the real-world environment. The augmented reality environment 320 may include one or more fiduciary markers, such as fiduciary marker 28, which may be used to provide a point of reference or measure for various objects within the augmented reality environment 320. In some cases, fiduciary marker 28 may utilize wireless signals for determining a reference point within the augmented reality environment 320. In this case, a wireless fiduciary marker may be embedded within a wall or located behind the wall. The distance between wireless fiduciary markers and between fiduciary markers and an HMD may be determined using time-of-flight techniques.

In some embodiments, an HMD may display one or more virtual objects corresponding with various construction elements in response to commands provided by an end user of the HMD. The commands may include voice commands and/or gestures performed by the end user of the HMD. In one example, the end user of the HMD may point towards a particular construction element associated with a structure and simultaneously issue a particular voice command in order to determine if the particular construction element satisfies various building codes and regulations.

Figure 5:
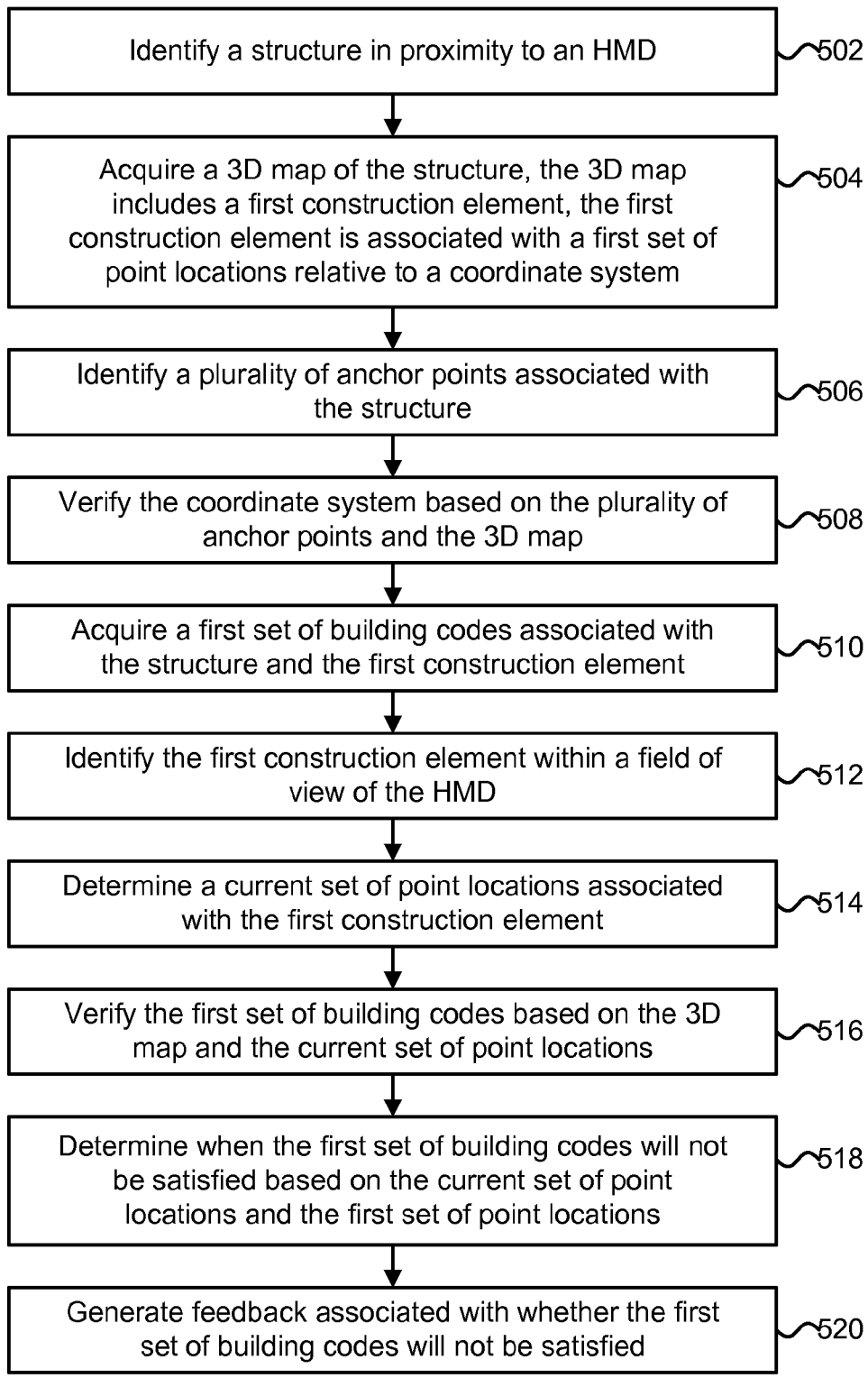
FIG. 5 is a flowchart describing one embodiment of a method for verifying whether portions of a structure comply with various building codes and predicting if the structure will fail to comply with the various building codes at some point in the future.

FIG. 5 is a flowchart describing one embodiment of a method for verifying whether portions of a structure comply with various building codes and predicting if the structure will fail to comply with the various building codes at some point in the future. In one embodiment, the process of FIG. 5 is performed by a mobile device, such as mobile device 19 in FIG. 1.

In step 502, a structure in proximity to an HMD (or other mobile device) is identified. The structure may be identified via table lookup of the structure corresponding with a particular address or GPS location. The structure may also be identified via image recognition techniques.

In step 504, a 3D map of the structure is acquired. The 3D map may be generated or updated in real-time as the structure is being constructed or modified. The 3D map may comprise a 3D model of the structure. The 3D map may include 3D models or virtual objects corresponding with each of the construction elements of the structure. The 3D map may include a virtual object corresponding with a first construction element. The first construction element may be associated with a first set of point locations relative to a coordinate system corresponding with the structure. The first set of point locations may comprise one or more point locations describing locations in space for a 3D model of the first construction element relative to the coordinate system. In one example, the location of a 3D model of a 2 by 4 piece of lumber may be described using a single point (e.g., a center point of the object). In another example, the location of a 3D model of a 2 by 4 piece of lumber may be described using eight points corresponding with the eight vertices of the 2 by 4 as modeled as a rectangular prism. The first construction element may comprise a wall stud or a water pipe and may be associated with component properties such as a particular material (e.g., the first construction element is made of wood or metal), identification information (e.g., the first construction element comprises a 2 by 4 piece of lumber), historical placement information (e.g., the date and time when the first construction element was fixed or otherwise became part of a structure and an identification of the person responsible for placement of the first construction element), and connectivity information (e.g., how the first construction element is connected to other construction elements). One embodiment of a process for acquiring a 3D map is described later in reference to FIG. 6A.

In step 506, a plurality of anchor points associated with the structure are identified. An anchor point may comprise a fiduciary marker or other structure reference point for determining distances and coordinate spaces relative to the structure. The plurality of anchor points may be used to determine the coordinate system corresponding with the structure. In one embodiment, four anchor points are used to define the coordinate system for the structure. Three of the four points may correspond with a ground plane associated with a foundation of the structure. The Z-line through the fourth point into or perpendicular to the ground plane may comprise a Z dimension of the coordinate system. The X dimension of the coordinate system may comprise an X-line through two of the three points of the ground plane and the Y dimension of the coordinate system may comprise a Y-line perpendicular to the X-line, lying in the ground plane and passing through the Z-line. The plurality of anchor points may be specified by the 3D map acquired in step 504.

In step 508, the coordinate system corresponding with the structure is verified based on the plurality of anchor points and the 3D map. In some cases, the coordinate system may be verified by comparing the location of each of the plurality of anchor points with their previously recorded locations. The distances between various anchor points may also be used to verify the coordinate system (i.e., if the distances between the plurality of anchor points has not changed, then it is likely that the coordinate system based on the anchor points is still valid).

In step 510, a first set of building codes associated with the structure is acquired. The first set of building codes may correspond with construction rules regarding the placement of the first construction element. The first set of building codes may comprise structural, electrical, and/or heating requirements for the structure. In one example, the first construction element may comprise a fire alarm and the first set of building codes may comprise fire prevention related regulations (e.g., the maximum distance between any two fire alarms must not be more than 20 feet). In cases where a determination that the structure complies with the first set of building codes is not required, this step is optional and may be omitted.

In step 512, the first construction element is identified within a field of view of the HMD (or other mobile device). The first construction element may be identified by applying image recognition techniques. In step 514, a current set of point locations associated with the first construction element is determined. In one embodiment, the first construction element is associated with a set of point locations corresponding with the shape of the first construction element. The set of point locations may describe the overall shape and orientation (assuming that the shape is not symmetrical) of the first construction element. The current set of point locations may be determined by identifying portions of the first construction element corresponding with each of the set of point locations and determining a location relative to the coordinate system for each of the identified portions.

In step 516, the first set of building codes is verified based on the 3D map and the current set of point locations (i.e., the currently observed locations of the first construction element). The first set of building codes may be verified by applying the first set of building codes to the 3D map of the structure. The first set of building codes may consider the number of particular construction elements within a given area of the structure and the placements of the particular construction elements relative to another construction element (e.g., the placement of a wall stud relative to a window frame or doorframe). In some cases, the first set of building codes may be verified by determining distances between the current set of point locations with the placement of other similar construction elements of the structure. For example, the distance between wall studs made out of wood must not be greater than 5 feet along a particular supporting wall. In some cases, this step is optional and may be omitted.

In step 518, it is determined when the first set of building codes will not be satisfied based on the current set of point locations (i.e. the current location of the first construction element) and the first set of point locations specified by the 3D map (i.e., the last recorded location of the first construction element). In the case that the current set of point locations is within a margin of error of the first set of point locations, then the first construction element will be deemed to have not moved within the time between the recording of the first set of point locations and the determination of the current set of point locations. Otherwise, if the current set of point locations are different from the first set of point locations, then the first construction element will be deemed to have been moved from the point in time corresponding with the recording of the first set of point locations. Given the first set of point locations, the current set of point locations, and time duration between the acquisition of the two sets of point locations, an average velocity for the first construction element may be determined. The average velocity may be used to predict the movement of the first construction element in the future and to determine (assuming a constant average velocity over time) a point in time when the first construction element will no longer comply with the first set of building codes. In some cases, this step is optional and may be omitted. One embodiment of a process for determining when the first set of building codes will not be satisfied due to movement of the first construction element is described later in reference to FIG. 7.

In step 520, feedback associated with whether the first set of building codes will not be satisfied is generated. In one embodiment, an HMD may provide audio or image-based feedback to an end user of the HMD. The audio-based feedback may comprise a sound or audio warning. The image-based feedback may comprise a highlighting or coloring of a particular construction element as viewed by the end user of the HMD.

Figure 6A:
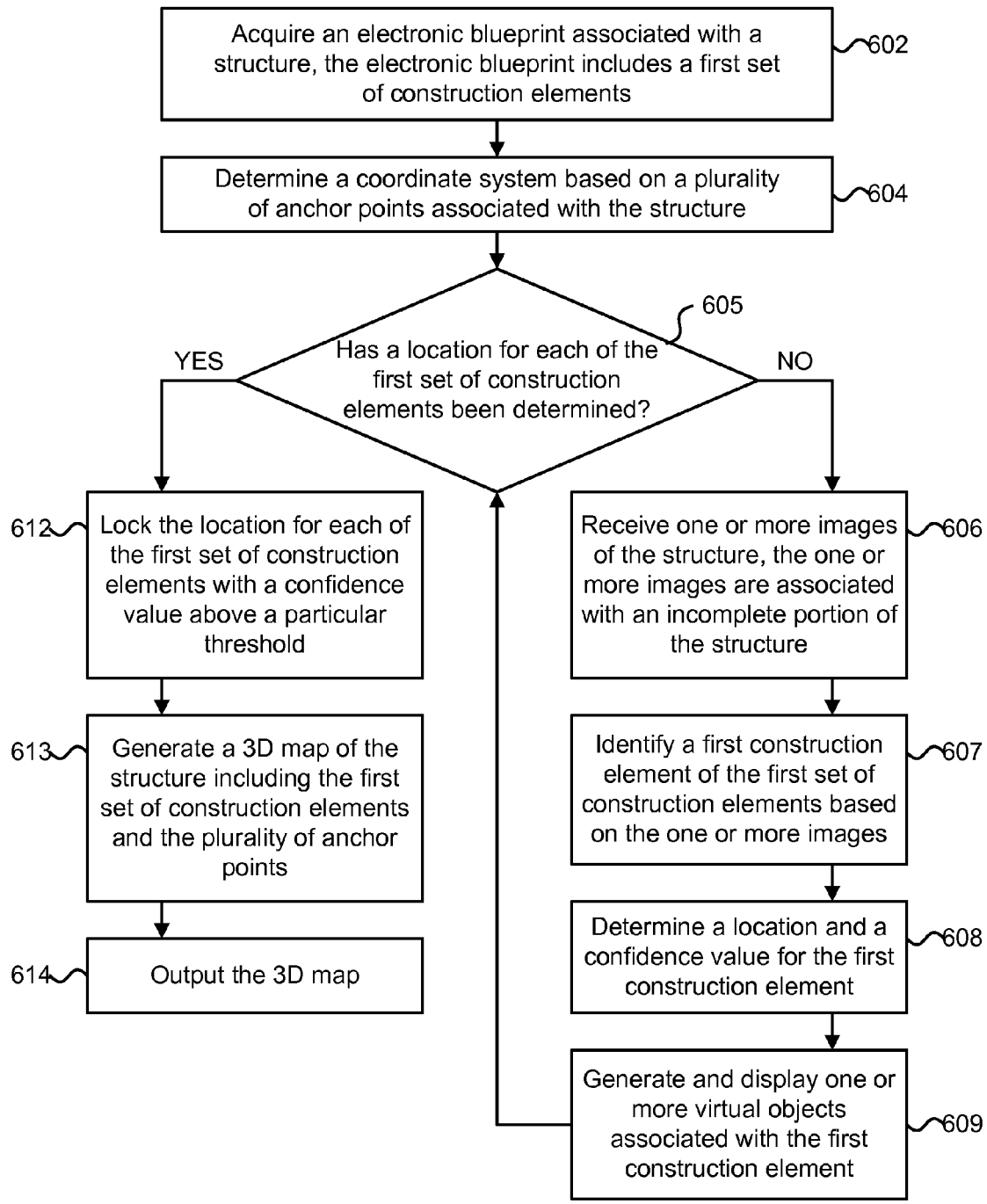
FIG. 6A is a flowchart describing one embodiment of a process for acquiring a 3D map.

FIG. 6A is a flowchart describing one embodiment of a process for acquiring a 3D map. The process described in FIG. 6A is one example of a process for implementing step 504 in FIG. 5. In one embodiment, the process of FIG. 6A is performed by a mobile device, such as mobile device 19 in FIG. 1.

In step 602, an electronic blueprint associated with a structure is acquired. The electronic blueprint may include a first set of construction elements. The electronic blueprint may comprise an electronic version of a schematic or other technical drawing that describes the connections and construction elements used to build a structure.

In some embodiments, the first set of construction elements may be identified on-the-fly based on a set of generic template models of various construction elements (i.e., the first set of construction element is not bound to only those found in the electronic blueprint of the structure). The set of generic template models may include 3D models for various construction elements such as wall studs, pipes, support beams, electrical sockets, windows, window frames, doors, and door frames, as well as image descriptors for identifying each of the various construction elements. In this case, a construction worker wearing an HMD may work normally on building a structure without actively worrying about positioning the HMD in order to update physical locations for various construction elements being added or fixed to the structure (i.e., no end user intervention is required).

Furthermore, a 3D map or construction model of the structure may include representations for construction elements that are not explicitly used in the electronic blueprint of the structure. For example, an electronic blueprint of a structure may include four vertical support beams, but the actual structure built may include five vertical support beams. In this case, the 3D map of the structure may include models for the five vertical support beams and the corresponding physical location information for each of the five vertical support beams. In some embodiments, discrepancies between the 3D map of the structure and the electronic blueprint of the structure may be reported to the end user of the HMD and/or may cause an automatic updating of the electronic blueprint to include new construction elements identified with the structure. In one embodiment, an electronic blueprint or schematic of the structure may be generated from the 3D map.

In step 604, a coordinate system based on a plurality of anchor points associated with the structure is determined. The coordinate system may be determined by detecting the plurality of anchor points associated with the structure within one or more images of the structure. The one or more images may correspond with different images taken within an environment of the structure (e.g., the images may have been captured from different points of view, taken at different points in time, and/or associated with different types of information such as color or depth information). The one or more images may be registered into a single real-world coordinate system associated with the structure. The registration and/or alignment of images (or objects within the images) onto a common coordinate system allows for the comparison and integration of real-world objects, landmarks, or other features extracted from the different images.

In step 605, it is determined whether a location for each of the first set of construction elements relative to the coordinate system corresponding with the structure has been determined. If the location has been determined for each of the first set of construction elements, then step 612 is performed. Otherwise, if a location for each of the first set of construction elements has not been determined, then step 606 is performed. In step 606, one or more images of the structure are received. The one or more images may be associated with an incomplete portion of the structure. The incomplete portion of the structure may comprise a portion of the structure that is still being built (e.g., studs and pipes being constructed prior to drywall being laid over the studs and pipes).

In one embodiment, the one or more images of the structure may be received from an authorized HMD worn by a construction worker. Each of the one or more images of the structure may be associated with a location or point of view associated with the HMD from which the particular image was captured. In step 607, a first construction element of the first set of construction elements is identified based on the one or more images. The first construction element may be identified by applying image recognition techniques to the one or more images.

In step 608, a location and a confidence value for the first construction element are determined. In one embodiment, an initial location or range of locations for the first construction element may be based on building codes associated with the structure. The location confidence value may be improved by confirming the location of the first construction elements through different images corresponding with different views of the first construction element in relation to other construction elements or the plurality of anchor points. One embodiment of a process for determining a location and a confidence value for a construction element is described later in reference to FIG. 6B.

In step 609, one or more virtual objects associated with the first construction element are generated and displayed. The one or more virtual objects may be used to provide guidance to an end user of an HMD to walk around the structure and confirm the location of the first construction element. The one or more virtual objects may include virtual arrows or instructions to help guide the end user of the HMD to acquire different viewpoints of the first construction element. One embodiment of a process for generating and displaying one or more virtual objects associated with a construction element is described later in reference to FIG. 6C.

In step 612, the location for each of the first set of construction elements with a confidence value above a particular threshold is locked. The locking of a particular construction element may correspond with the determination that it has been fixed in place with respect to the structure. In step 613, a 3D map of the structure is generated. The 3D map of the structure may include the first set of construction elements and the plurality of anchor points. In one embodiment, the first set of construction elements may only include construction elements that have been locked. In step 614, the 3D map is outputted. The 3D map may be outputted or transmitted to a mobile device, such as mobile device 19 in FIG. 1. In some cases, portions of the 3D map (or model) may be flattened into an electronic blueprint of the structure.

Figure 6B:
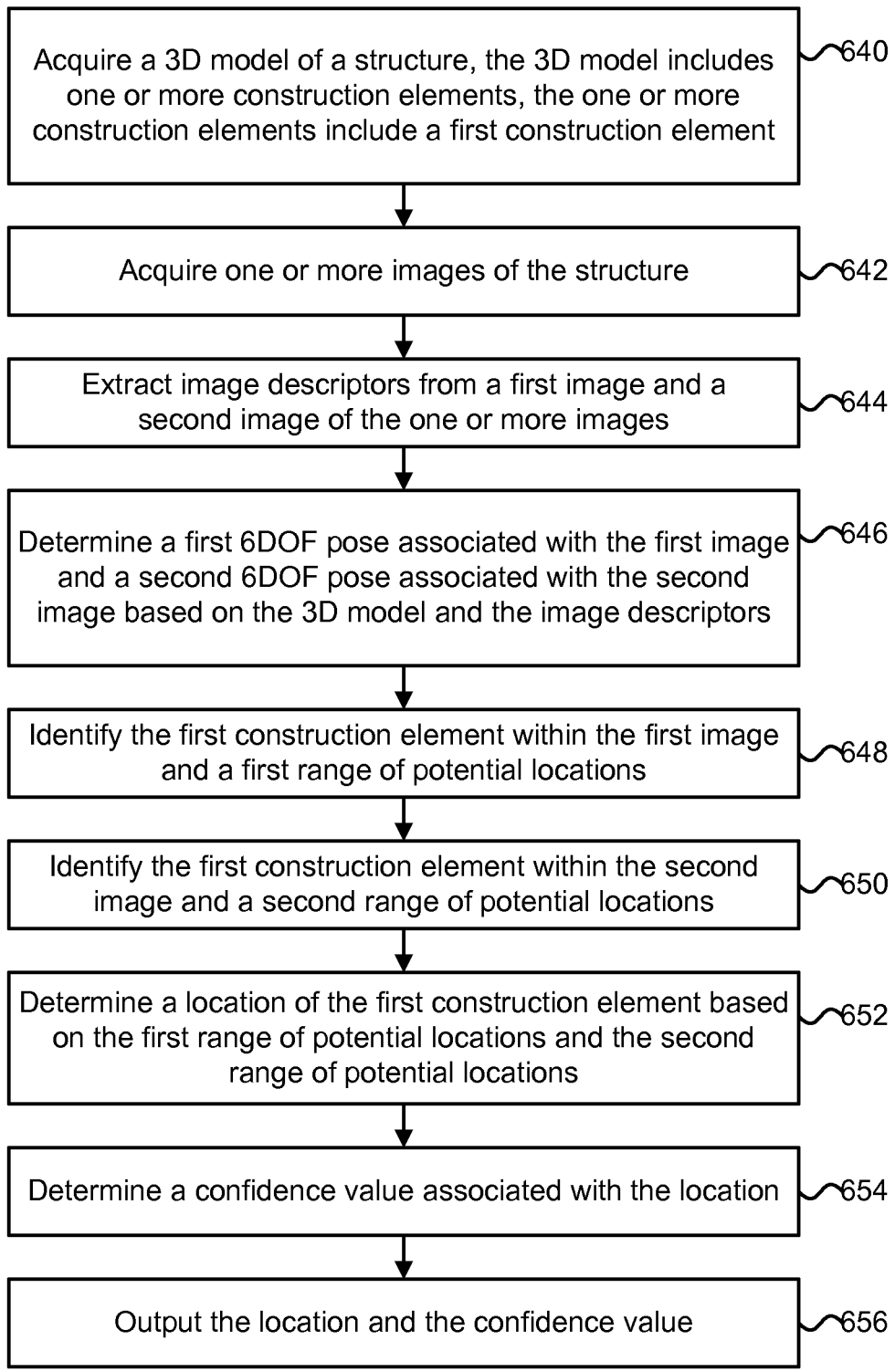
FIG. 6B is a flowchart describing one embodiment of a process for determining a location and a confidence value associated with a construction element.

FIG. 6B is a flowchart describing one embodiment of a process for determining a location and a confidence value associated with a construction element. The process described in FIG. 6B is one example of a process for implementing step 608 in FIG. 6A. In one embodiment, the process of FIG. 6B is performed by a mobile device, such as mobile device 19 in FIG. 1.

In step 640, a 3D model of a structure is acquired. The structure may comprise a building or non-building structure. The 3D model may include one or more construction elements including a first construction element. In step 642, one or more images of the structure are acquired. The one or more images may correspond with image captures from an HMD worn within an environment of the structure.

In step 644, image descriptors are extracted from a first image of the one or more images and a second image of the one or more images. The image descriptors may be extracted or detected within the first image and the second image by applying various image processing methods such as object recognition, feature detection, corner detection, blob detection, and edge detection methods to the one or more images. The image descriptors may be used as landmarks in determining a particular pose, position, and/or orientation in relation to the 3D model. In some cases, stationary landmarks associated with the structure may act as anchor points or reference points for the 3D map.

The image descriptors may be associated with image features that are easily observed and distinguished from other features within a field of view of an HMD. For each object within a real-world environment, there may be one or more image descriptors associated with the object that can be extracted and used to identify the object (e.g., a construction element). An image descriptor may comprise image information related to a portion of an object or to the entire object. In one example, an image descriptor may describe characteristics of the object such as its location, color, texture, shape, and/or its relationship to other objects or landmarks within the environment. Utilizing image processing techniques such as object and pattern matching, the one or more image descriptors may be used to locate an object in an image containing other objects. It is desirable that the image processing techniques for detecting and matching the one or more image descriptors be robust to changes in image scale, noise, illumination, local geometric distortion, and image orientation. In one embodiment, an image descriptor may include color and/or depth information associated with a particular object (e.g., a red apple) or a portion of a particular object within the particular environment (e.g., the top of a red apple).

In step 646, a first six degree of freedom (6DOF) pose is determined for the first image and a second 6DOF pose is determined for the second image based on the 3D model and the image descriptors extracted in step 644. A 6DOF pose may comprise information associated with the position and orientation of an HMD within the environment of the structure. In some cases, a first-pass estimate for the pose associated with an HMD may be obtained by utilizing GPS location information and orientation information acquired from the HMD.

More information regarding performing pose estimation and/or localization for a mobile device can be found in U.S. Pat. No. 8,711,206, "Mobile Camera Localization Using Depth Maps," issued Apr. 29, 2014.

In step 648, the first construction element is identified within the first image and a first range of potential locations for the first construction element is determined. In step 650, the first construction element is identified within the second image and a second range of potential locations for the first construction element is determined. In step 652, a location of the first construction element is determined based on the first range of potential locations and the second range of potential locations. In one embodiment, the location of the first construction element may correspond with an intersection of the first range (or distribution) of potential locations and the second range (or distribution) of potential locations. In some embodiments, the first range of potential locations may be based off of a first set of images of the one or more images and the second range of potential locations may be based off a second set of images of the one or more images. The variability in a particular range or distribution of potential locations may be used to weigh the determination of the location in favor of distributions with a higher degree of confidence in the actual location of the first construction element.

In step 654, a confidence value associated with the location is determined. The confidence value may be associated with the degree of confidence in which the location determined in step 652 is the actual location of the first construction element within the structure. The confidence value may correspond with a distribution width associated with one or more potential locations. In step 656, the location and the confidence value are outputted.

Figure 6C:
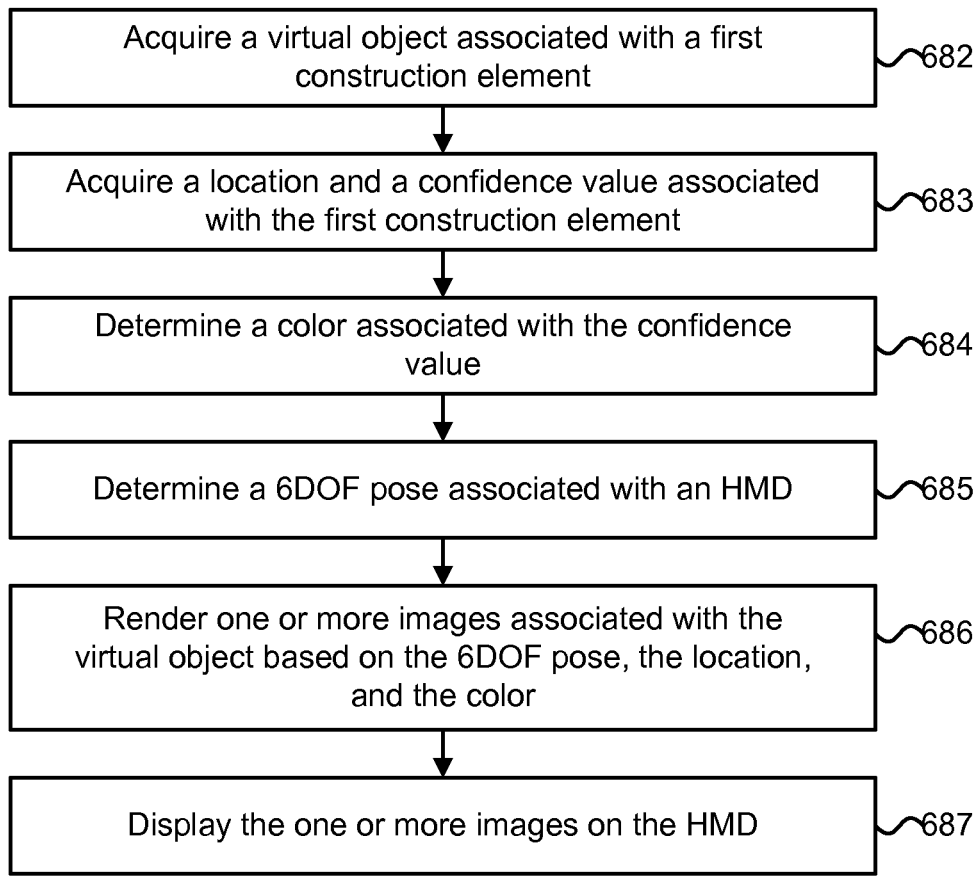
FIG. 6C is a flowchart describing one embodiment of a process for generating and displaying one or more virtual objects associated with a construction element.

FIG. 6C is a flowchart describing one embodiment of a process for generating and displaying one or more virtual objects associated with a construction element. The process described in FIG. 6C is one example of a process for implementing step 609 in FIG. 6A. In one embodiment, the process of FIG. 6C is performed by a mobile device, such as mobile device 19 in FIG. 1.

In step 682, a virtual object associated with the first construction element is acquired. The virtual object may be acquired from a server, such as server 15 in FIG. 1. In step 683, a location and a confidence value associated with the first construction element is acquired. In some cases, the virtual object itself may include location information such as the location and the location confidence value of the first construction element. In step 684, a color associated with the confidence value is determined. In one example, the color associated with confidence values below a particular threshold is red. In step 685, a 6DOF pose associated with an HMD is determined. In step 686, one or more images associated with the virtual object are rendered based on the 6DOF pose, the location, and the color. In step 687, the one or more images are displayed on the HMD.

Figure 7:
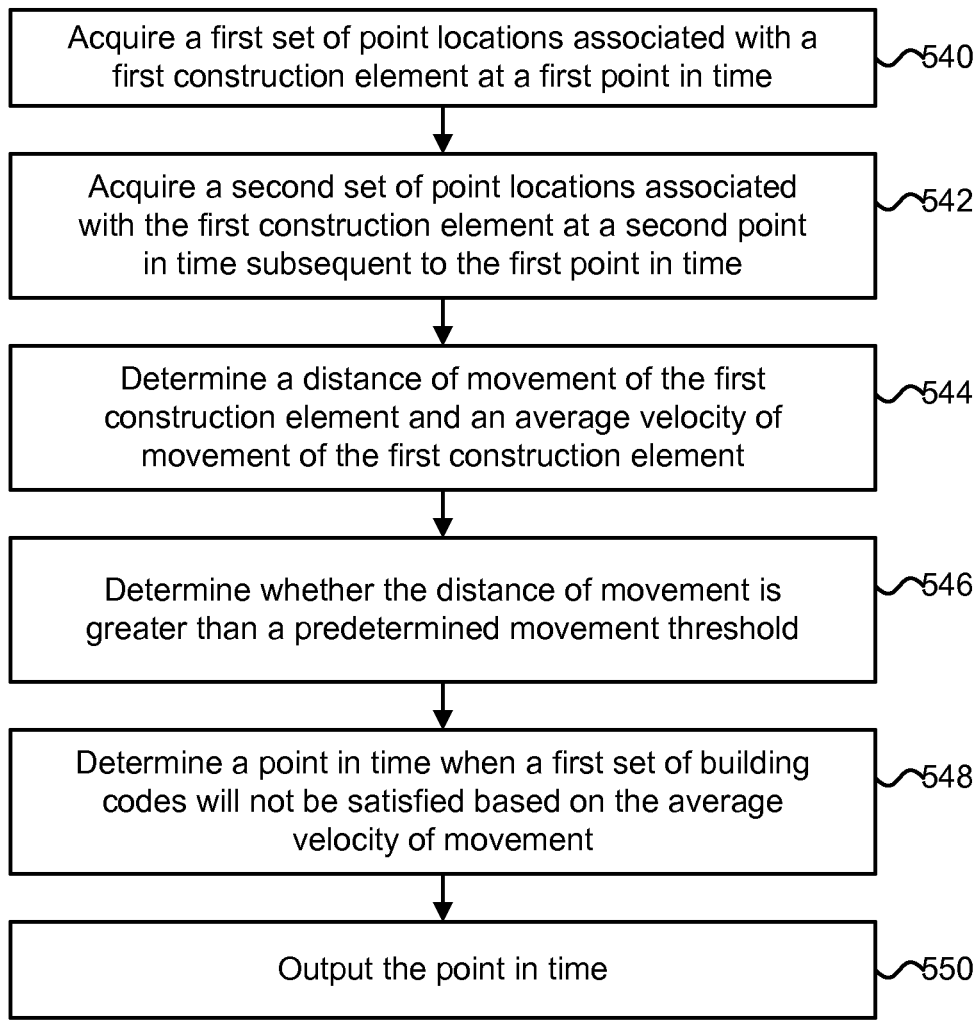
FIG. 7 is a flowchart describing one embodiment of a process for determining when a first set of building codes will not be satisfied.

FIG. 7 is a flowchart describing one embodiment of a process for determining when a first set of building codes will not be satisfied. The process described in FIG. 7 is one example of a process for implementing step 518 in FIG. 5. In one embodiment, the process of FIG. 7 is performed by a mobile device, such as mobile device 19 in FIG. 1.

In step 540, a first set of point locations associated with the first construction element at a first point in time is acquired. In one example, the first construction element may comprise a rectangular support beam for a house and the first set of point locations may correspond with the eight vertices of the rectangular support beam as modeled as a rectangular prism. In step 542, a second set of point locations associated with the first construction element at a second point in time subsequent to the first point in time is acquired. In step 544, a distance of movement of the first construction element and an average velocity of movement of the first construction element are determined. In one embodiment, the average velocity of movement of the first construction element comprises the difference in center of mass locations associated with the first set of point locations and the second set of point locations divided by the time duration between when the first set of point locations and the second set of point locations were determined.

In step 546, it is determined whether the distance of movement is greater than a predetermined movement threshold. If the distance of movement is greater than a predetermined threshold, then the first construction element may be deemed to have moved from its location corresponding with the first set of point locations. Otherwise, if the distance of movement is less than the predetermined threshold, then the first construction element may be deemed to have remained in a fixed location. In step 548, a point in time when a first set of building codes will not be satisfied is determined based on the average velocity of movement determined in step 544. In the case that the first construction element has remained in a fixed location, then the point in time may be set based on an estimated component lifetime. The point in time when the first set of building codes will not be satisfied may be determined by performing calculations associated with various points in time and an estimated location of the first construction element based on the average velocity of movement of the first construction element. In step 550, the point in time is outputted. In one embodiment, if the point in time is less than a particular time duration associated with the component lifetime of the first construction element, then an alert may be provided to an end user of a mobile device.

One embodiment of the disclosed technology includes acquiring a 3D map of the structure. The 3D map includes one or more virtual objects corresponding with the one or more construction elements. The one or more construction elements include a first construction element of the structure. The method further includes identifying at the mobile device the first construction element within a field of view of the mobile device, determining a current set of point locations associated with the first construction element in response to the identifying at the mobile device the first construction element, updating a first virtual object of the one or more virtual objects with the current set of point locations, the first virtual object corresponds with the first construction element, determining a confidence value associated with the current set of point locations, and displaying on the mobile device one or more images associated with the first construction element and the confidence value.

One embodiment of the disclosed technology includes acquiring a 3D map of the structure. The 3D map includes virtual objects associated with a plurality of construction elements. The plurality of construction elements includes a first construction element of the structure. The method further includes acquiring a first set of building codes associated with the structure, identifying at the mobile device the first construction element, determining a current set of point locations associated with the first construction element, verifying the first set of building codes based on the 3D map and the current set of point locations, generating feedback associated with whether the first set of building codes is not satisfied, and displaying on the mobile device one or more images associated with the feedback.

One embodiment of the disclosed technology includes generating a 3D map of the structure as the structure is being constructed. The 3D map includes a virtual object associated with a first construction element of the structure. The virtual object is associated with a first set of point locations. The method further includes acquiring a first set of building codes associated with the structure, determining that an end user of the mobile device is gazing at the first construction element, determining a current set of point locations associated with the first construction element in response to the end user of the mobile device gazing at the first construction element, determining whether the first set of building codes will not be satisfied at a future point in time based on the first set of point locations and the current set of point locations, generating feedback associated with whether the first set of building codes will not be satisfied, and displaying on the mobile device one or more images associated with the feedback.

One embodiment of the disclosed technology includes a memory, one or more processors, and a see-through display. The memory stores a 3D map of the structure. The 3D map includes a virtual object associated with a first construction element of the structure. The memory stores a first set of building codes associated with the structure. The one or more processors detect an end user of the electronic device gazing at the first construction element, determine a current set of point locations associated with the first construction element in response to the end user of the electronic device gazing at the first construction element, verify the first set of building codes based on the 3D map and the current set of point locations, generate feedback associated with whether the first set of building codes is not satisfied, and render one or more images based on the feedback. The see-through display displays the one or more images.

Figure 8:
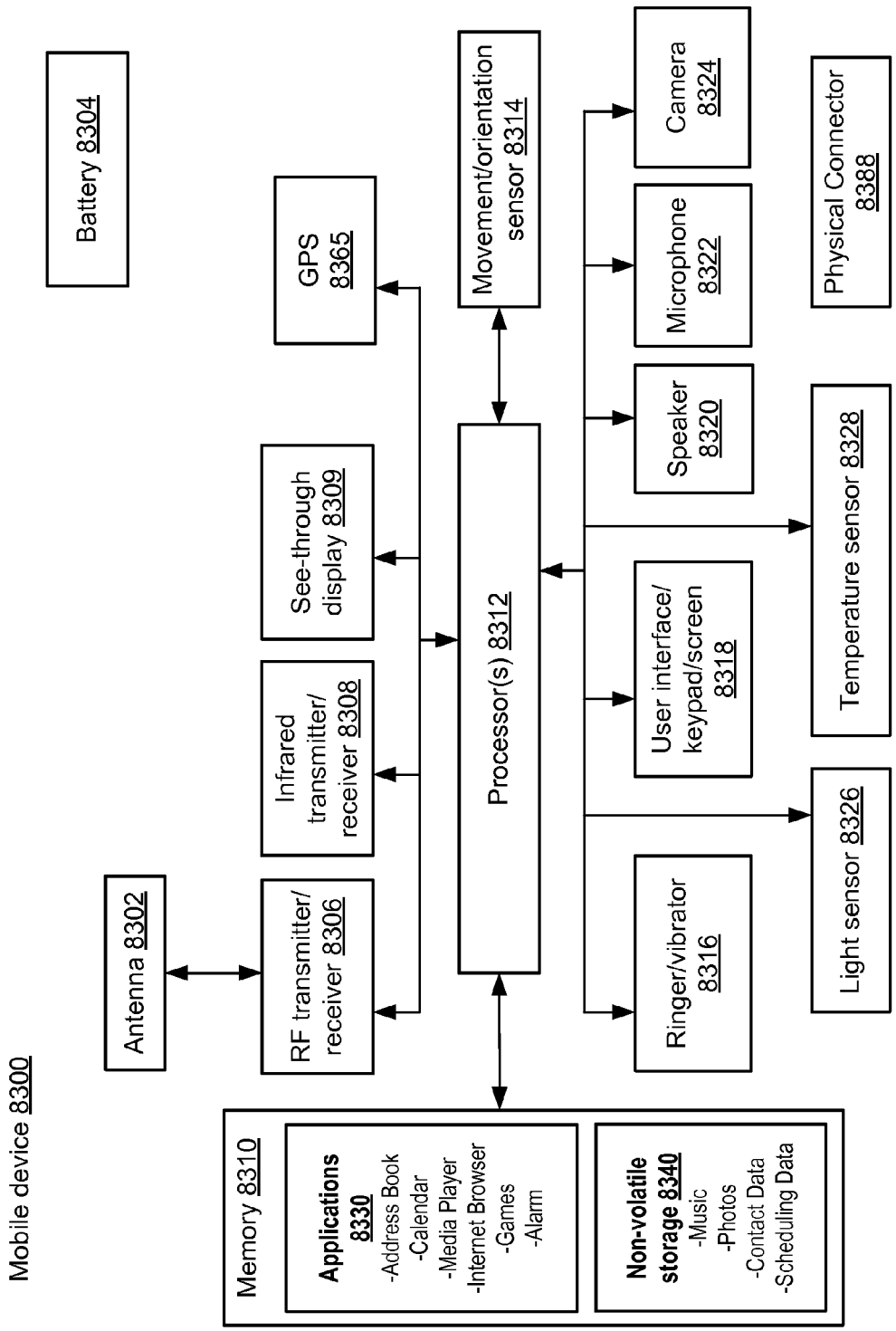
FIG. 8 is a block diagram of one embodiment of a mobile device.

FIG. 8 is a block diagram of one embodiment of a mobile device 8300, such as mobile device 19 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electro-mechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for recording actual physical locations associated with one or more construction elements of a structure using a mobile device, comprising:
    acquiring a 3D map of the structure, the 3D map includes one or more virtual objects corresponding with the one or more construction elements, the one or more construction elements include a first construction element of the structure;
    identifying at the mobile device the first construction element within a field of view of the mobile device;
    determining a current set of point locations associated with the first construction element in response to the identifying at the mobile device the first construction element;
    updating a first virtual object of the one or more virtual objects with the current set of point locations, the first virtual object corresponds with the first construction element;
    determining a confidence value associated with the current set of point locations; displaying on the mobile device one or more images associated with the first construction element and the confidence value;
    identifying a plurality of anchor points associated with the structure;
    determining a plurality of locations associated with the plurality of anchor points; and
    verifying a coordinate system associated with the 3D map based on the plurality of locations.

2. The method of claim 1, further comprising:
    acquiring a first set of building codes associated with the structure;
    verifying the first set of building codes based on the 3D map and the current set of point locations;
    generating feedback associated with whether the first set of building codes is not satisfied; and
    outputting the feedback to an end user of the mobile device.

3. The method of claim 2, further comprising:
    determining a point in time when the first set of building codes will not be satisfied; and
    alerting an end user of the mobile device if the point in time is within a particular time frame associated with a component lifetime of the first construction element.

4. The method of claim 3, wherein:
    the determining a point in time when the first set of building codes will not be satisfied includes determining an average velocity of movement associated with the first construction element.

5. The method of claim 2, wherein:
    the first construction element comprises a fire alarm; and
    the first set of building codes is associated with fire prevention related regulations.

6. The method of claim 1, wherein:
    the mobile device comprises a head-mounted display device; and
    the one or more images comprise colored versions of the first construction element.

7. The method of claim 1, wherein:
    the acquiring a 3D map of the structure includes generating the 3D map automatically without intervention by an end user of the mobile device; and
    the updating a first virtual object is performed automatically without intervention by the end user of the mobile device.

8. The method of claim 1, wherein:
    the 3D map of the structure only includes construction elements that have been locked.

9. One or more storage devices containing processor readable code for programming one or more processors to perform a method for verifying a structure using a mobile device comprising the steps of:
    generating a 3D map of the structure as the structure is being constructed, the 3D map includes a virtual object associated with a first construction element of the structure, the virtual object is associated with a first set of point locations;
    acquiring a first set of building codes associated with the structure;
    determining that an end user of the mobile device is gazing at the first construction element;

determining a current set of point locations associated with the first construction element in response to the end user of the mobile device gazing at the first construction element;

determining whether the first set of building codes will not be satisfied at a future point in time based on the first set of point locations and the current set of point locations;

generating feedback associated with whether the first set of building codes will not be satisfied;

displaying on the mobile device one or more images associated with the feedback;

identifying a plurality of anchor points associated with the structure;

determining a plurality of locations associated with the plurality of anchor points; and verifying a coordinate system associated with the 3D map based on the plurality of locations.

10. The one or more storage devices of claim 9, wherein:
the 3D map of the structure only includes construction elements that have been locked.

11. The one or more storage devices of claim 9, wherein:
the determining whether the first set of building codes will not be satisfied at a future point in time includes determining an average velocity of movement associated with the first construction element based on the first set of point locations and the current set of point locations.

12. The one or more storage devices of claim 9, wherein:
the first construction element comprises a fire alarm; and
the first set of building codes is associated with fire prevention related regulations.

13. The one or more storage devices of claim 9, wherein:
the mobile device comprises a head-mounted display device.

14. An electronic device for verifying a structure, comprising:

a memory, the memory stores a 3D map of the structure, the 3D map includes a virtual object associated with a first construction element of the structure, the memory stores a first set of building codes associated with the structure;

one or more processors, the one or more processors detect an end user of the electronic device gazing at the first construction element, the one or more processors determine a current set of point locations associated with the first construction element in response to the end user of the electronic device gazing at the first construction element, the one or more processors verify the first set of building codes based on the 3D map and the current set of point locations, the one or more processors generate feedback associated with whether the first set of building codes is not satisfied, the one or more processors render one or more images based on the feedback, the one or more processors identify a plurality of anchor points associated with the structure and verify a coordinate system associated with the 3D map based on the plurality of anchor points; and a see-through display, the see-through display displays the one or more images.

15. The electronic device of claim 14, wherein:
the one or more processors determine a point in time when the first set of building codes will not be satisfied, the one or more processors determine the point in time based on an average velocity of movement associated with the first construction element.

16. The electronic device of claim 14, wherein:
the electronic device comprises a head-mounted display device.

17. The electronic device of claim 14, wherein:
the first construction element comprises a fire alarm; and
the first set of building codes is associated with fire prevention related regulations.

* * * * *